United States Patent
Choi

(10) Patent No.: US 7,564,562 B2
(45) Date of Patent: Jul. 21, 2009

(54) METHOD FOR DEMODULATING SIGNALS FROM A DISPERSIVE WHITE LIGHT INTERFEROMETRIC SENSOR AND ITS APPLICATION TO REMOTE OPTICAL SENSING

(75) Inventor: Han-Sun Choi, Houston, TX (US)

(73) Assignee: Ziebel (US), Inc., Houston, TX (US)

( * ) Notice: Subject to any disclaimer, the term of this patent is extended or adjusted under 35 U.S.C. 154(b) by 317 days.

(21) Appl. No.: 11/678,135

(22) Filed: Feb. 23, 2007

(65) Prior Publication Data

US 2008/0204759 A1    Aug. 28, 2008

(51) Int. Cl.
*G01B 9/02* (2006.01)
*G01J 3/45* (2006.01)

(52) U.S. Cl. ............................ 356/454; 356/480
(58) Field of Classification Search ............ 356/454, 356/477, 479, 480, 482, 519
See application file for complete search history.

(56) References Cited

U.S. PATENT DOCUMENTS 5,535,002 A * 7/1996 Csipkes et al. ............. 356/496
7,245,382 B2 * 7/2007 Ronnekleiv ................ 356/477
2005/0237538 A1 * 10/2005 Belleville .................. 356/504

OTHER PUBLICATIONS

Qi, et al., Novel data processing techniques for dispersive white light interferometers, Opt. Eng. 42:11 3165-3171, Nov. 2003.
Hart et al, Fast surface profiling by spectral analysis of white light interferograms with Fourier transform spectroscopy, Applied Optics, v. 37, No. 10, Apr. 1998.
Tapia-Mercado et al, Precision and sensitivity optimization for white light interferometric fiber optic sensors, Journal of Lightwave Technology, v. 19, No. 1, Jan. 2001.
Schnell et al, Dispersive white light interferometry for absolute distance measurement with dielectric multilayer systems on the target, Optics Letters, v. 21, No. 7 Apr. 1996.

* cited by examiner

*Primary Examiner*—Michael A Lyons
(74) *Attorney, Agent, or Firm*—Richard A. Fagin

(57) ABSTRACT

A method for demodulating signals from a dispersive, white light interferometer includes generating test interferometry spectra from an interferometer forming part of a sensor for various values of interferometer sensor optical path length. The various test spectra are correlated to a measured spectrum from the sensor to generate a correlation function. The sensor optical path length resulting in the correlation function value reaching a maximum is selected as the optical path length.

16 Claims, 9 Drawing Sheets

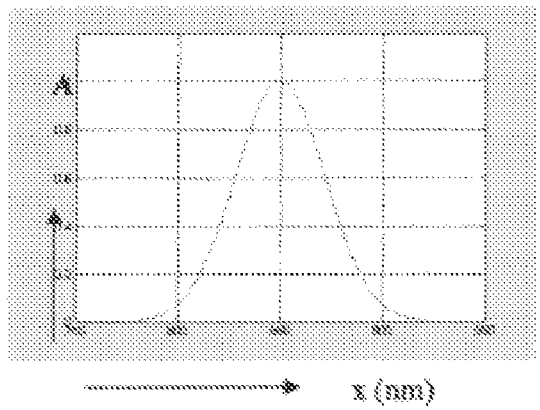
FIG. 4A Source spectrum
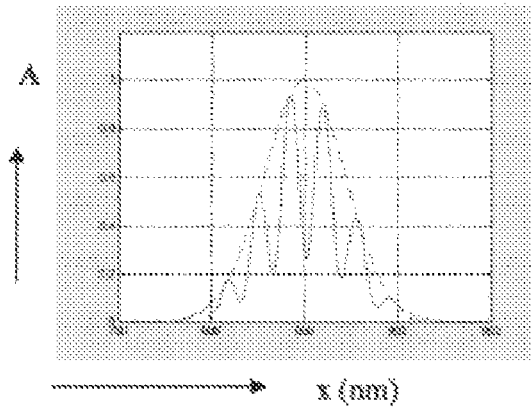
FIG. 4B Interference spectrum
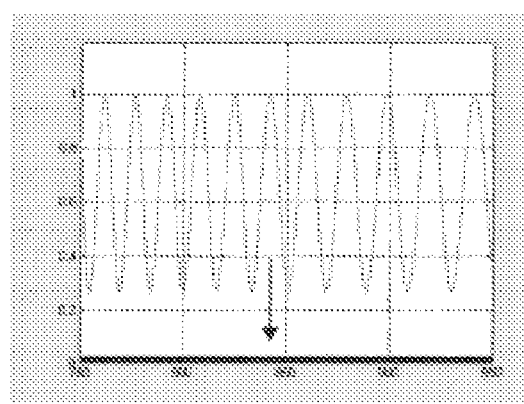
FIG. 5A Normalized data
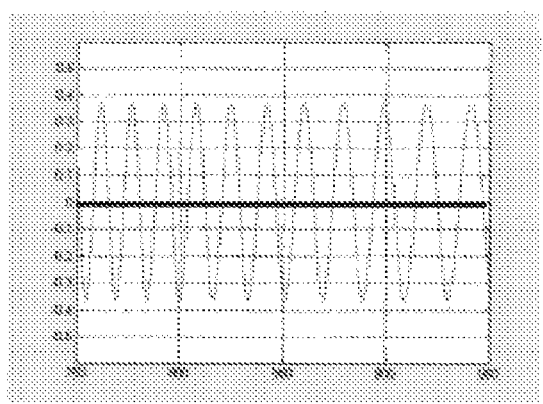
FIG. 5B Zero centered data

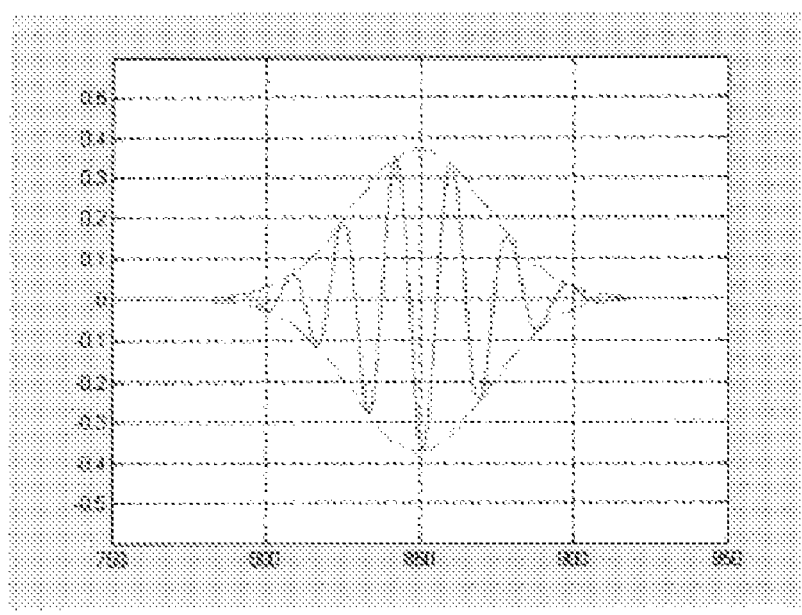
FIG. 6 Applying Gaussian envelope, ready for multiplication
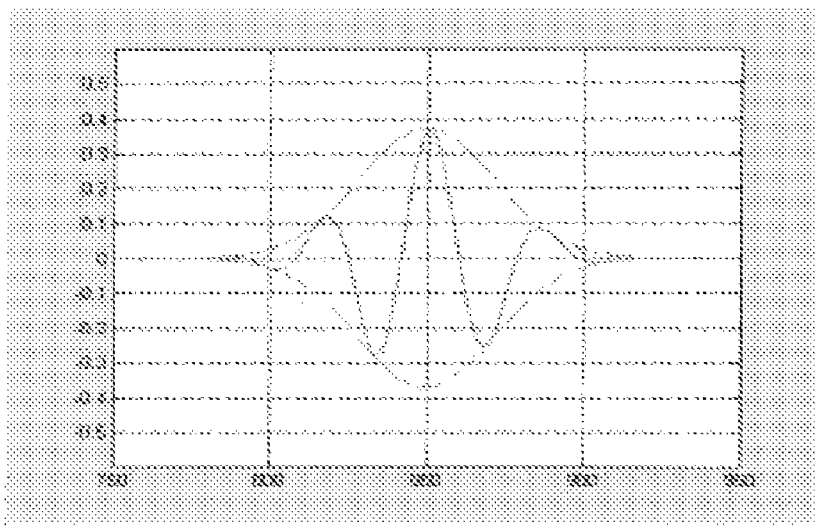
FIG. 7A

METHOD FOR DEMODULATING SIGNALS FROM A DISPERSIVE WHITE LIGHT INTERFEROMETRIC SENSOR AND ITS APPLICATION TO REMOTE OPTICAL SENSING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of optical sensing of physical parameters. More specifically, the invention relates to methods for demodulating optical path differences of a dispersive white light interferometric sensor to determine the value of parameter measured by the sensor.

2. Background Art

Optical sensors generate a signal that causes a property of light passed through the sensor to correspond in a determinable manner to a parameter measured by the sensor. One such sensor is known as an extrinsic fiber Fabry Perot interferometric ("EFPI") sensor. The basic structure of EFPI sensors is described in Bing Qi, et al., *Novel data processing techniques for dispersive white light interferometer*, Optical Engineering 42(11), pp. 3165-3171 (November 2003), Society of Photo-Optical instrumentation Engineers. In an EFPI sensor, a lead in fiber and a reflected fiber are bonded inside a glass tube such that ends of the lead in and reflected fibers are separated by a small air gap. Changes in the ambient environment on the glass tube change the air gap. A broadband light source is applied to the lead in fiber, some of which is reflected by the fiber end and other portions of which are reflected by the end of the reflected fiber. Combination of both reflected light portions in the lead in fiber creates an interference pattern that is related to the size of the air gap, and thus to the physical parameter being measured by the EFPI sensor.

Various techniques are known in the art for converting the interference pattern into an optical path difference ("OPD") for dispersive white light interferometry, and correspondingly, the magnitude of the measured parameter. One such technique is described in the Qi et al. paper cited above. Other techniques are described in, J. Schwindler et al., *Dispersive interferometric profiler*, Optics Letters, vol. 19, no. 13, (1994) Optical Society of America, and in U. Schnell et al., *Dispersive white light interferometry for absolute distance measurement with dielectric multilayer systems on the target*, Optics Letters, vol. 21, no. 7 (1996), Optical Society of America. Still other techniques are described in J. Tapia-Mercado et al., *Precision and Sensitivity Optimization for White-Light Interferometric Fiber-Optic sensors*, J. Lightwave Tech., vol. 19, no. 1 (2001) Institute of Electrical and Electronics Engineers and M. Hart et al., *Fast surface profiling by spectral analysis of white-light interferograms with Fourier transform spectroscopy*, Applied Optics, vol. 37, no. 10 (1998) Optical Society of America.

The foregoing techniques are intended to determine the optical path differences on a particular sensor by direct analysis of the interference pattern returned by the sensor. In a practical application of EFPI sensors, such as monitoring parameters in a wellbore drilled through Earth formations, the length of the lead in fiber, which can be several kilometers, can make it difficult to resolve the spectrum of the interference pattern due to a far reduced visibility of the interference spectrum and other noise components. What is needed is a technique that can resolve the interference pattern to determine the length of the air gap in an EFPI sensor even under conditions as would ordinarily be expected in wellbores drilled into the Earth. There continues to be a need for high accuracy, high precision demodulation methods for use in other dispersive, white light interferometric sensors, including, for example, Michelson and Mach-Zender interferometers having optical path difference related to the parameter being measured.

SUMMARY OF THE INVENTION

One aspect of the invention is a method for demodulating signals from an optical interferometer. A method according to this aspect of the invention includes generating test interferometry spectra for a dispersive white light interferometric sensor for various values of optical path difference through the optical sensor. The test spectra are correlated to a measured spectrum from the sensor to generate a correlation function. The optical path difference of the optical sensor is that which corresponds to the path difference of the test spectrum that generates the highest value of the correlation function.

In one embodiment, the test spectra are computer generated. In one embodiment, the sensor is an extrinsic fiber Fabry-Perot interferometer.

Another aspect of the invention is a method for measuring a parameter in a wellbore. A method according to this aspect of the invention includes applying a light source to an optical sensor disposed in the wellbore. The optical sensor is arranged to change an optical path difference therein in response to changes in the parameter. An output of the sensor is coupled to an optical interferometer. Test interferometry spectra are generated for various values of optical path difference of the sensor. The test spectra are correlated to a measured spectrum from the interferometer to generate a correlation function. An optical path difference of the sensor is determined to be that which is related to the path difference of the test spectra for which the correlation function value reaches a maximum. A value of the parameter from the determined optical path difference.

In one embodiment, the test spectra are computer generated. In one embodiment, the measured parameter is pressure. In one embodiment, the sensor is an extrinsic fiber Fabry-Perot interferometer.

Other aspects and advantages of the invention will be apparent from the following description and the appended claims.

BRIEF DESCRIPTION OF THE DRAWINGS

FIG. 4 shows source spectrum and interference spectrum data used in one embodiment of a method according to the invention.

FIG. 5 shows normalized and zero centered data.

FIG. 6 shows interference data ready for multiplication according to one embodiment of the invention.

DETAILED DESCRIPTION

Figure 1:
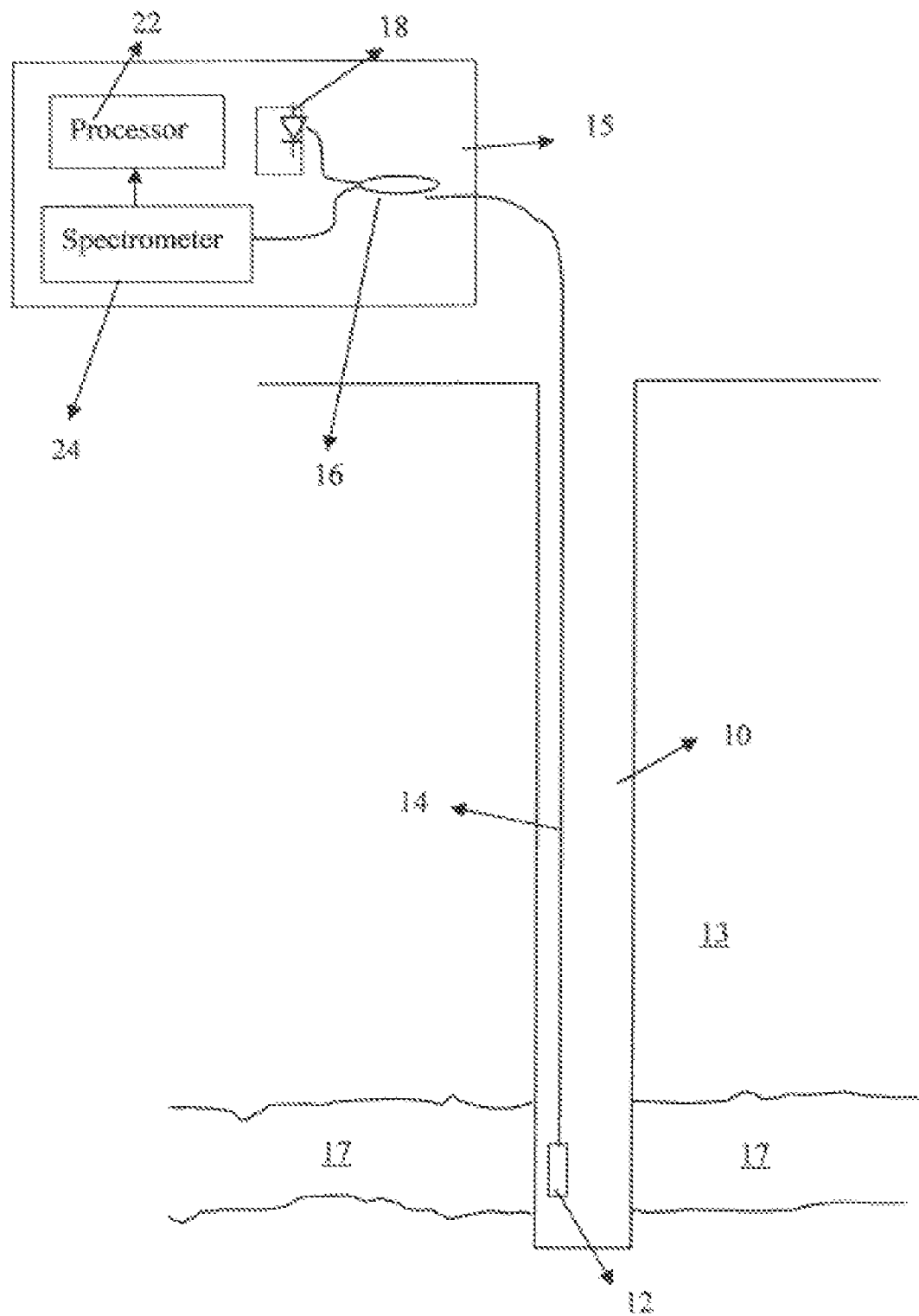
FIG. 1 shows an optical sensing system that may be used with a method according to the invention.

FIG. 1 shows an optical sensing system that may be used with a method according to the invention. A wellbore 10 is drilled through various formations 13 to or slightly below a target formation 17 such as a petroleum bearing reservoir. A sensor, which in this example may be an optical fiber type pressure sensor 12, is disposed in the wellbore 10 at a depth at which the pressure is to be measured. The sensor 12 in the present example is an EFPI sensor, which can be made as explained in the Background section herein. The sensor 12 is coupled to a surface instrumentation system 15 by a lead in fiber 14, which may be a multi-mode or single-mode optical fiber. Depending on the depth to which the sensor 12 is to be positioned, the lead in fiber may extend a length of several kilometers. Inside the surface instrumentation system 15, the lead in fiber is coupled to one side of a directional coupler 16, which may be a 2×1 coupler. The other side of the coupler 16 may be coupled to a broadband light source 18 such as a light emitting diode. In the present example the source 18 may have a mean wavelength of 850 nm (nanometers) and a bandwidth of 50 nm full width half maximum (FWHM). The other terminal of the coupler 16 is optically coupled to a spectrometer 24, which converts the light imparted to the spectrometer 24 into an electrical signal representing the spectral content of the light imparted to the spectrometer 24. The output of the spectrometer is related to amplitude of each of a plurality of wavelengths of light in the signal imparted to the spectrometer 24. An example spectrometer that may be used with a method according to the invention is sold under model number USB4000 by Ocean Optics, Inc., 830 Douglas Ave., Dunedin, Fla. 34698.

The description of the invention herein is made in terms of an EFPI sensor. It will be appreciated by those skilled in the art that such sensor and such type of optical interferometer are only one type of sensor and interferometer that may be used with a method according to the invention. The invention will work with any type of "white light" (broadband, dispersive light source) interferometric sensor wherein an optical path difference of the sensor is related to the parameter being measured by the sensor. Other types of interferometers that may be used with a method according to the invention include Mach-Zender interferometers and Michelson interferometers, for example. Accordingly, it is to be clearly understood that the scope of what has been invented is not limited to use with EFPI sensors. Other types of sensors include intrinsic fiber Fabry Perot sensors (wherein an optical gap length between reflective surfaces is entirely within optical fiber, and sensors that include a reference fiber and sensing fiber coupled to an interferometer. Accordingly, in the following description, reference to determining "air gap" of the sensor 12 is with reference only to the example sensor described herein. The scope of the invention encompasses determining optical path length of any type of interferometric sensor, examples of which are set forth above.

The sensor 12, as explained in the Background section herein, may operate as a Fabry-Perot interferometer. An interference pattern generated by the sensor 12 will be related to the air gap distance, d, between the fiber ends disposed in the sensor 12. Optical path difference in such sensor equals twice the air gap distance, d. The structure of the sensor 12 is such that the measured parameter, in the present example, pressure, will affect the air gap length in a determinable manner. The interference pattern is determined by the output of the spectrometer 24.

The output of the spectrometer 24 may be coupled to a processor 22, such as a programmable microprocessor, in order to analyze the interference pattern to determine the air gap length, and thus the value of the measured parameter.

Figure 2:
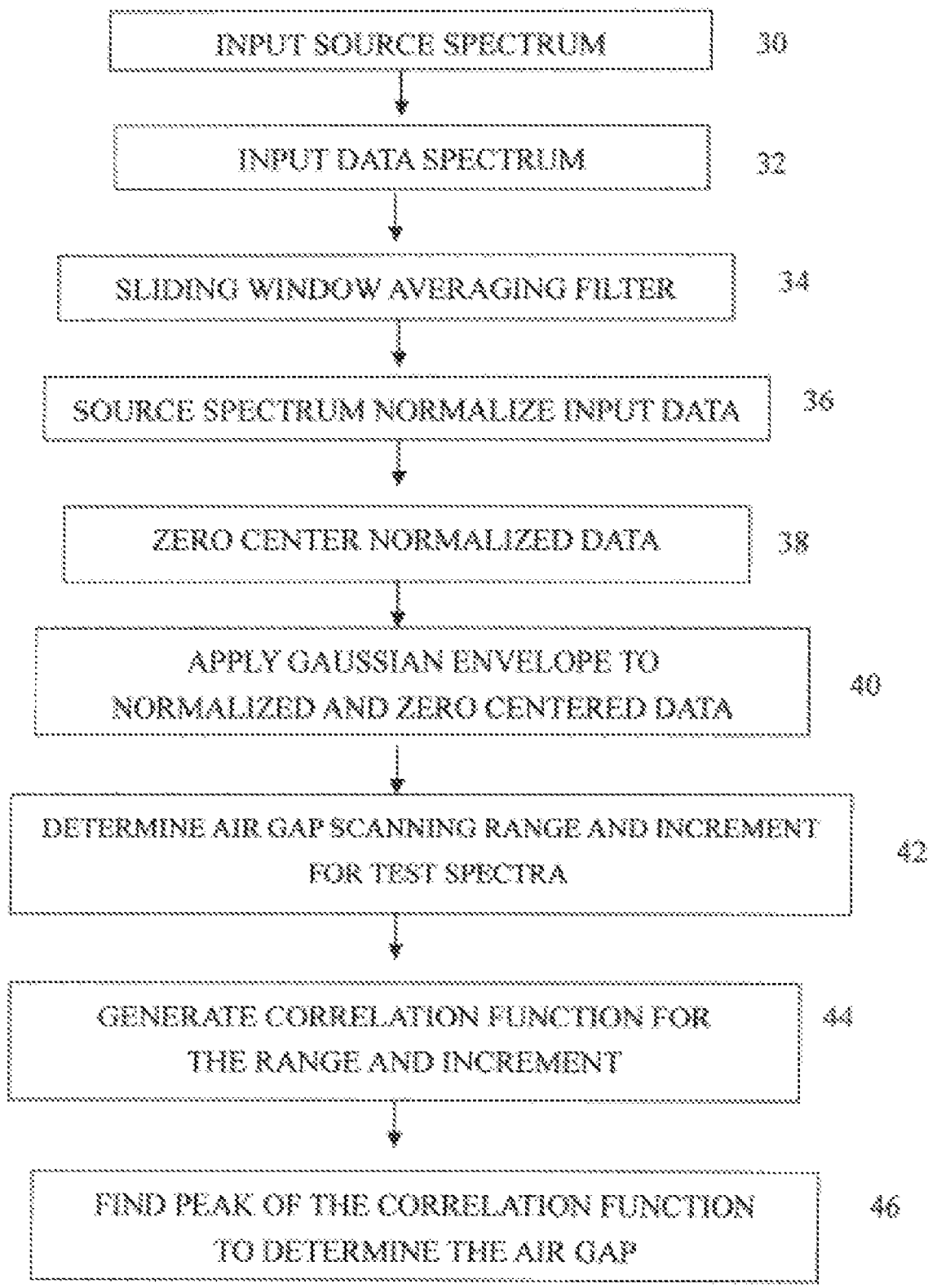
FIG. 2 is a flow chart of one example of a method according to the invention.

A flow chart of one example implementation of a method according to the invention is shown in FIG. 2. At 30, a source spectrum is input to the processor (22 in FIG. 1) and can be saved to the processor before the sensor 12 is connected. The source spectrum may be in digital form and may be represented by ordered pairs of numbers, one number representing wavelength of light and the other the amplitude of the source light at the particular wavelength. See FIG. 4A. Returning to FIG. 2, at 32, the sensor signal spectrum is also input to the processor (22 in FIG. 1). The signal spectrum represents various component wavelengths of light sent from the measuring interferometer including the information about the air gap of the sensor (12 in FIG. 1). Typical sensor signal spectra are shown in FIG. 4B. The signal spectrum may also be represented by a similar set of ordered number pairs.

Figure 7B:
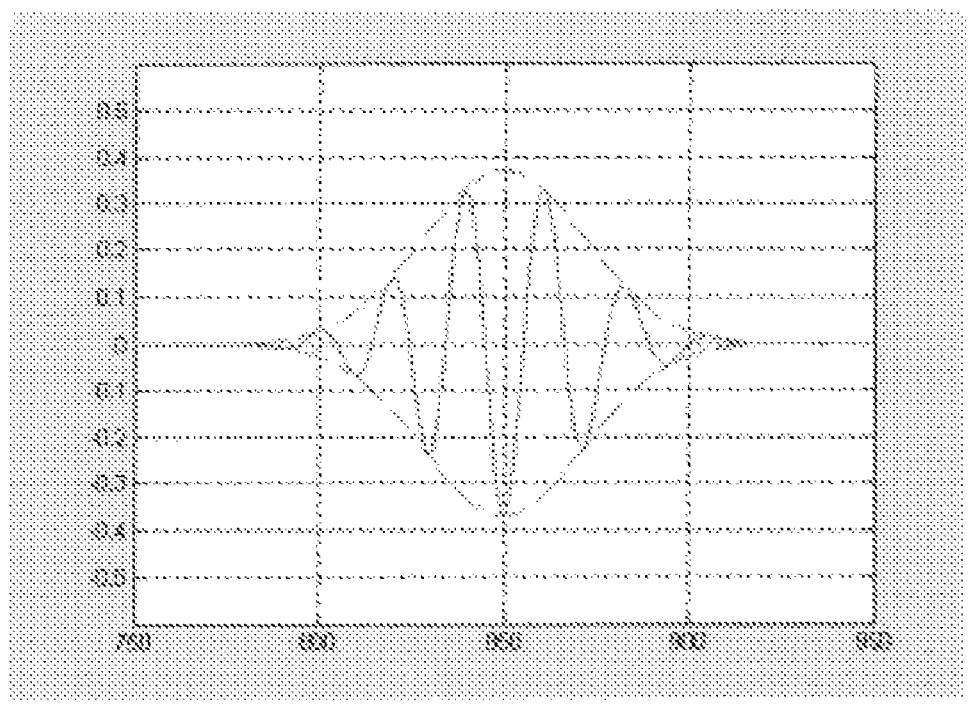
FIG. 7 shows a series of test spectra that are compared with the spectrum from the sensor.
Figure 7C:
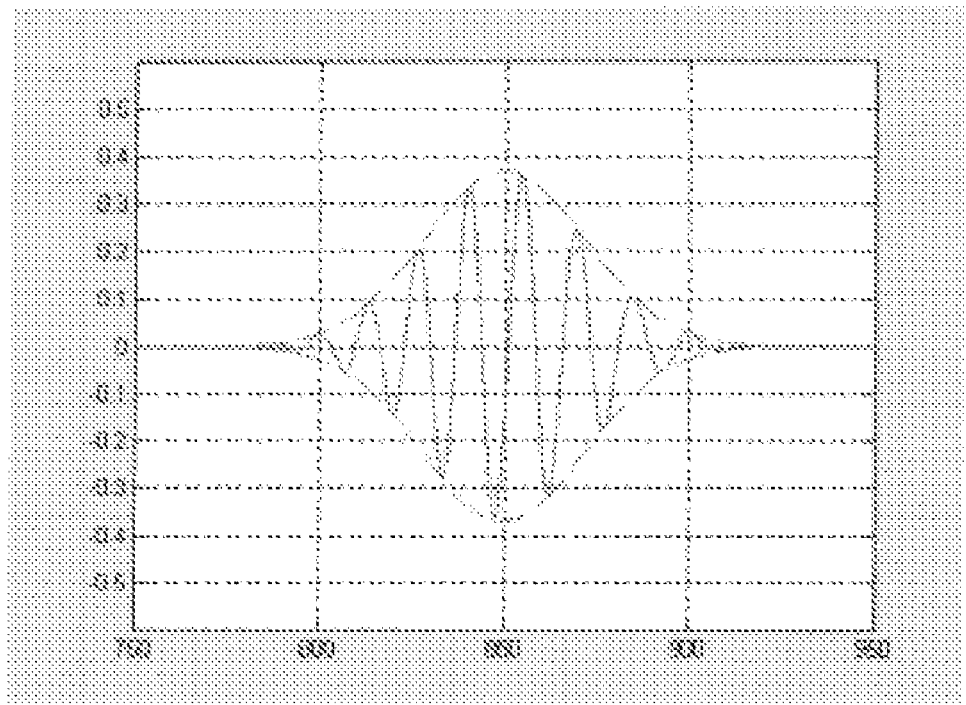
Figure 8:
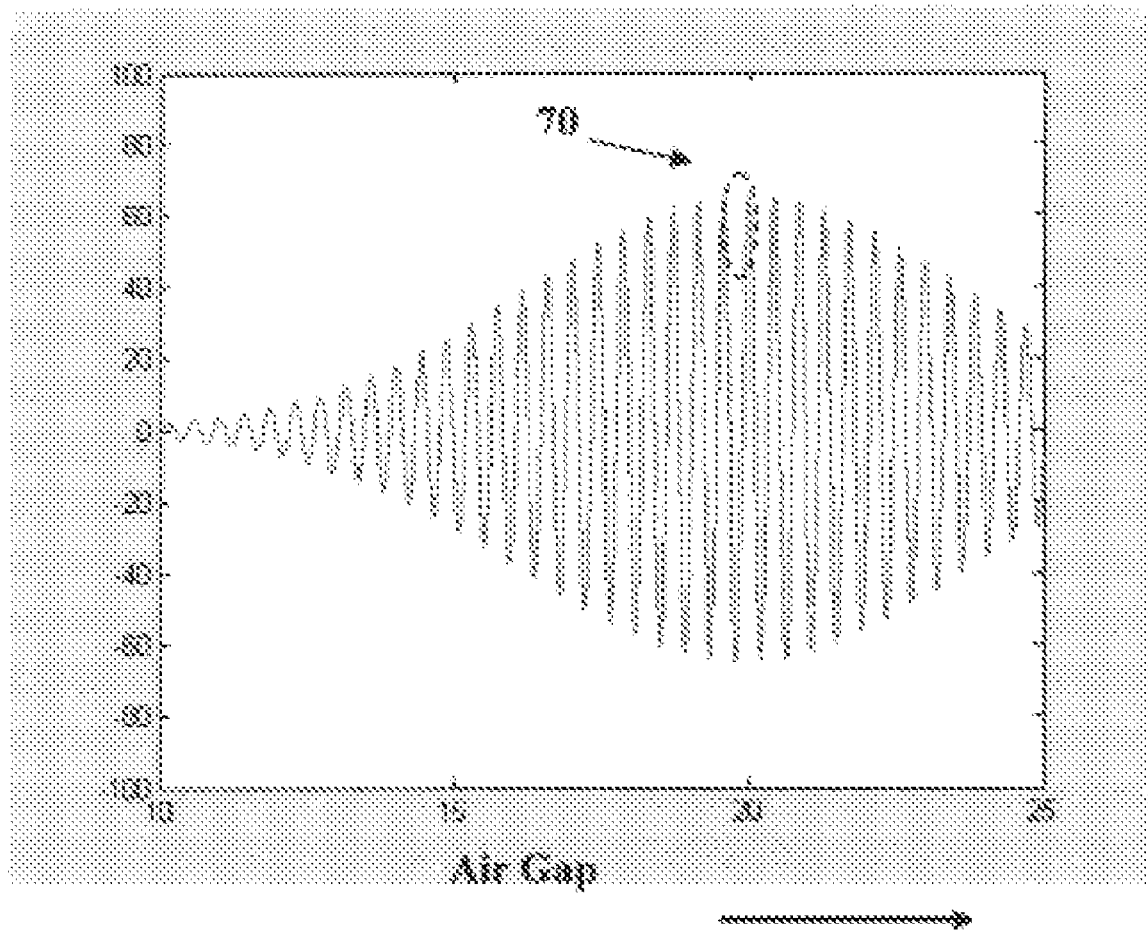
FIG. 8 shows the correlation function which reveals the sensor air gap by its central fringe position.

At 34, a sliding window (moving average) filter can be applied to the data spectrum. In the present example, the filter window extends through 21 data points. Thus, the first ten data points and last ten data points will provide input to the filter but will not generate a corresponding output value. At 36, the data spectrum can be normalized with respect to the source spectrum. Normalization may include dividing the amplitude value of the data spectrum at each wavelength by the amplitude value of the source spectrum at the corresponding wavelength. The result is a substantially "flat" data spectrum. See FIG, 5A. At 38 the source normalized spectrum may be centered on an amplitude value of zero. Such centering may be performed by subtracting an average amplitude for the entire normalized data set from each data point amplitude. See FIG. 5B At 40, a Gaussian envelope may be applied to the zero centered, normalized spectrum. See FIG. 6. At 42 an air gap scanning range and increment, for which the test spectra are generated, may be determined (manually input or automatically determined based on a previously determined air gap value). FIGS. 7A, 7B and 7C show a series of test spectra generated for an example range and increment. Once again referring to FIG. 2, at 44, the Gaussian envelope adjusted, normalized data spectrum may be correlated to test spectra to generate a correlation function. See, e.g., 70 in FIG. 8. Finally at 46 in FIG. 2, peak of the correlation function may be found to determine the correct value of the air gap.

In one implementation, test spectra are generated for values of air gap length incremented by the resolution of the sensor system. The test spectra may be generated by computer modeling of the sensor system, or may be determined empirically from a reference sensor (not shown) that is substantially identical to the sensor (12 in FIG. 1). In one example, such increment may be on the order of 0.001 μm (micrometers). In one example, the correlation may be performed for successive 0.001 μm increments of test spectra.

Figure 3:
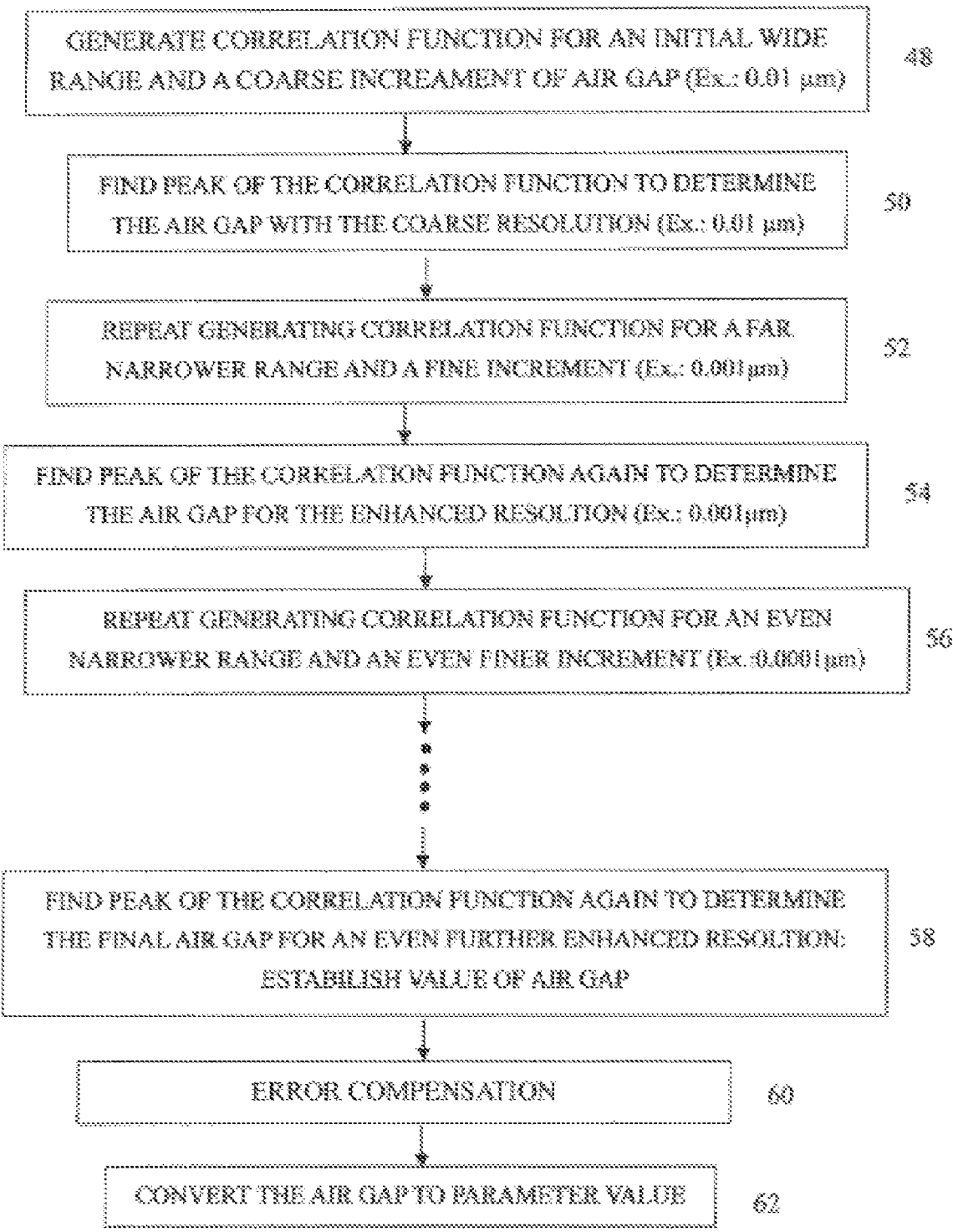
FIG. 3 is a flow chart of another example of a method according to the invention.
Figure 9:
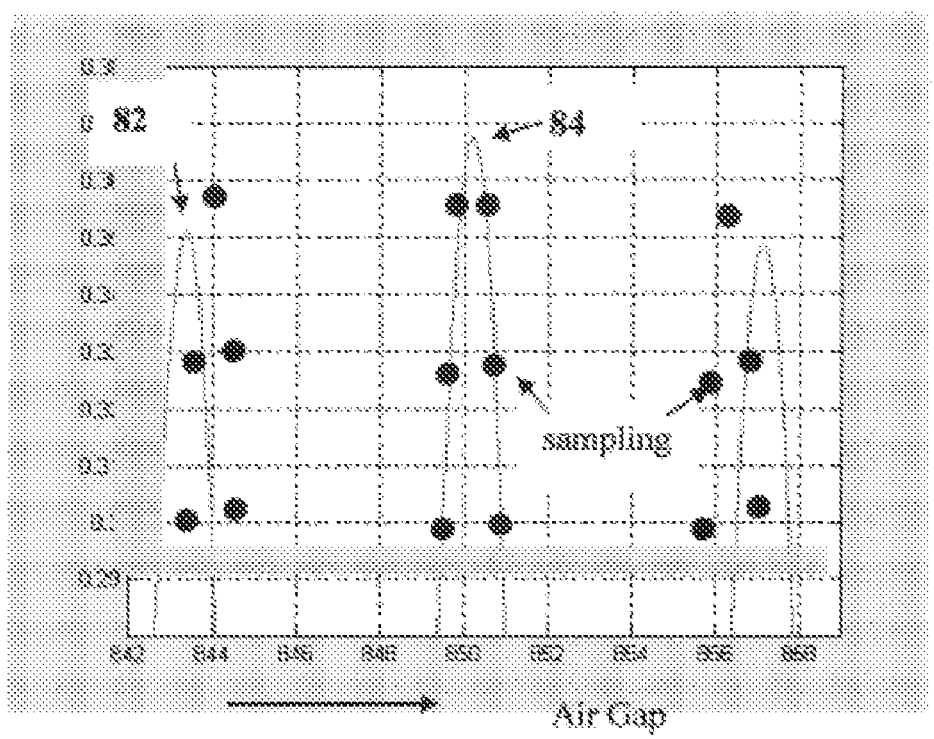
FIG. 9 shows an example of central fringe misidentification due to sampling phase mismatch for the initial coarse air gap scanning.
Figure 10:
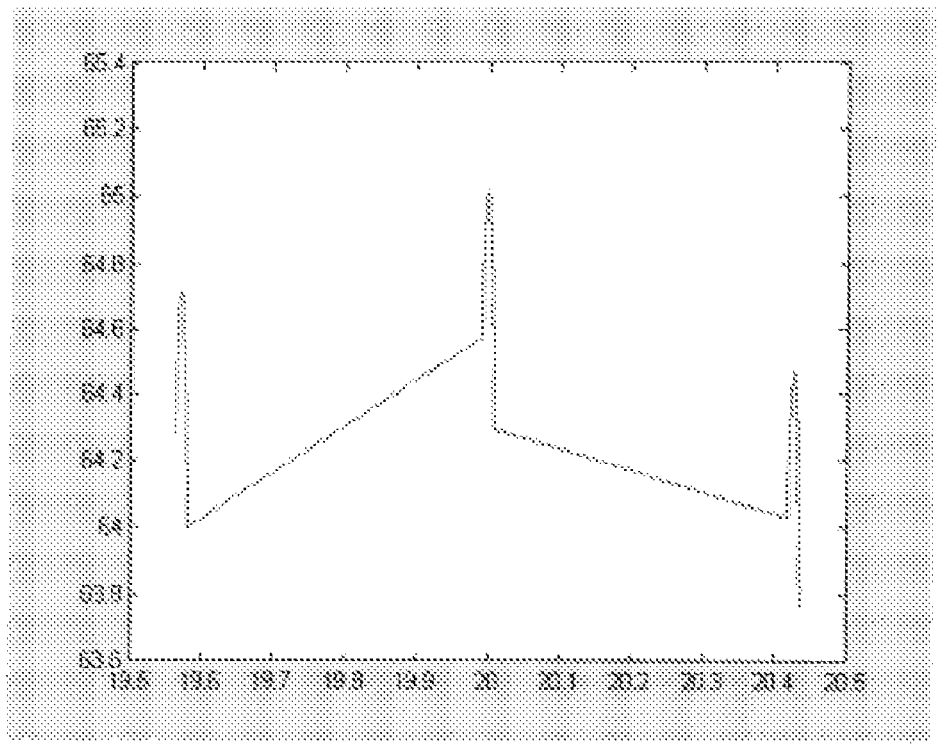
FIG. 10 shows a plot for a result of second stage scanning which performs central fringe confirmation and resolution enhancement at the same time.
Figure 11:
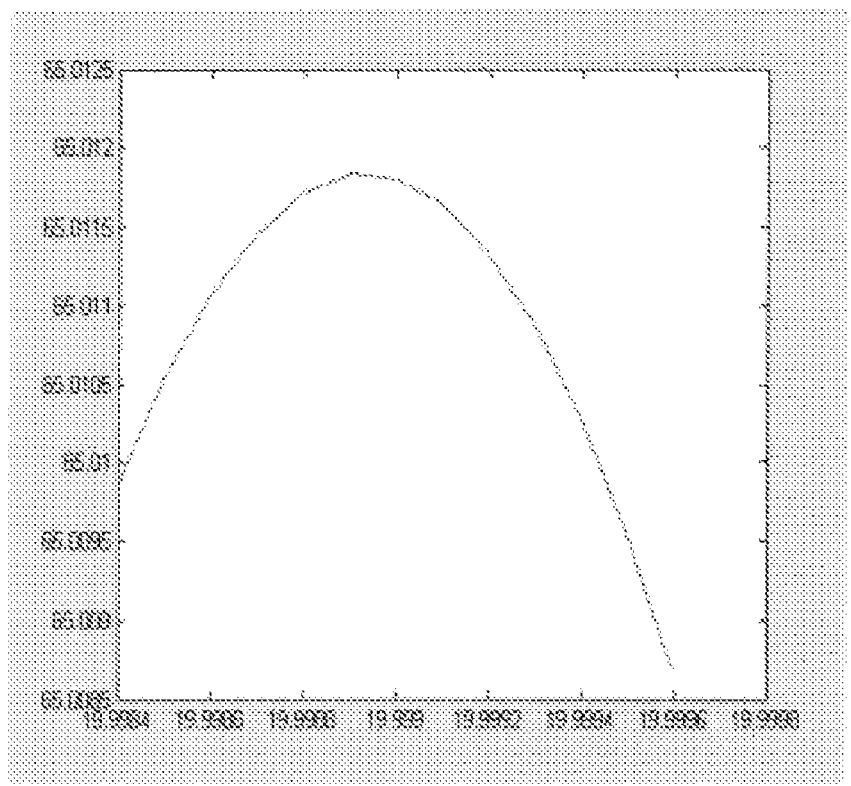
FIG. 11 is a plot for resolution enhancement.
Figure 12:
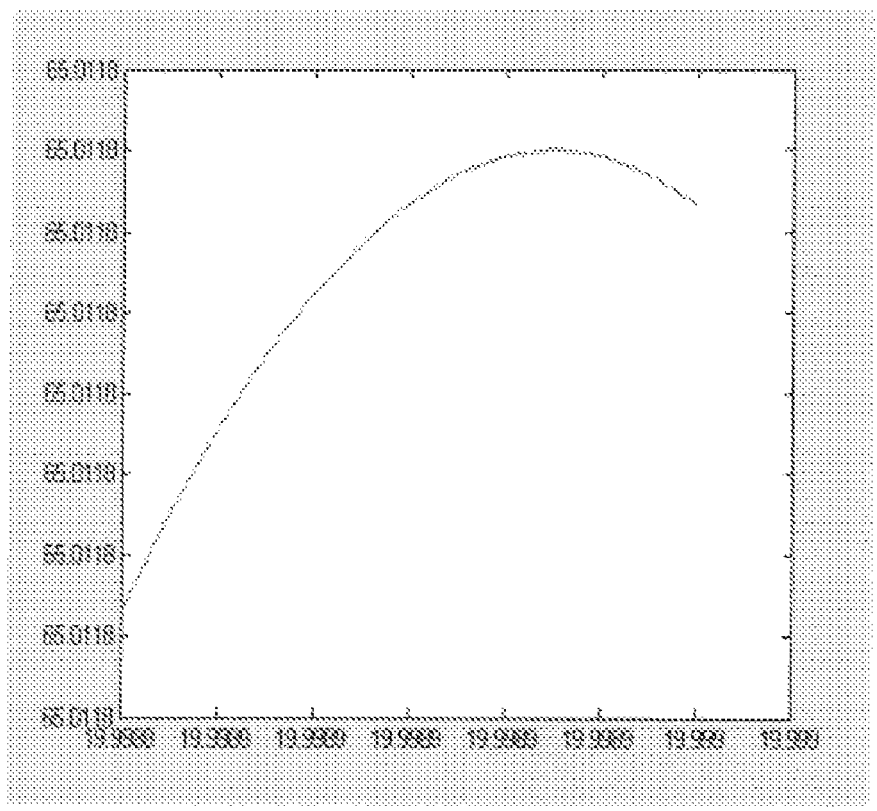
FIG. 12 is a plot for further enhancement of air gap reading resolution.

In another example, and with reference to FIG. 3, considerable computing time may be saved by using a stepped increment correlation technique. In such technique, and at 48 in FIG. 3, the correlation function is generated with a "coarse" resolution, for example, 0.01 μm or some other convenient multiple of the resolution of the air gap increment for which test spectra are generated. The air gap found at 50 has coarse resolution. Additionally there is a small chance of "central fringe" misidentification due to sampling (of air gap, not spectrum) phase mismatch in the initial coarse scanning. An example of such misidentification is shown at 82 in FIG. 9, with the correct peak shown at 84. Returning to FIG. 3, at 52 when finer increment scanning is performed, any such misidentification will be corrected if the new scanning range includes the two neighbor peaks. Because only the peaks are concerned here, only a narrow range around the three neighboring peaks could be scanned to save computing time, causing a coherence function including two discrete ranges. See, for example, FIG. 10. At 54 a peak may be found to again to determine a resolution enhanced air gap. Resolution enhancement may be repeated as many times as needed, shown at 54, 56, and 58 in FIG. 3, as long as the hardware implementation has the resolution required for a software implementation of such fine resolution to be meaningful. Examples of successively finer resolution are shown in FIG. 11 and FIG. 12. At 60 in FIG. 3, the value of air gap length established may be corrected for any error caused by the moving average filter. The value of the error correction depends on moving average filter window size and the actual air gap. Such error is predictable, so it may be predetermined and stored in the processor (22 in FIG. 1). Finally, at 62, the error corrected value of air gap length is converted to a value of the parameter being measured. In the present example, such parameter may be ambient pressure. The various elements of the method explained above with reference to FIGS. 2 and 3 will be explained in more detail below. The reflection spectrum of a Fabry-Perot interferometer is a function of the optical phase shift, $\phi$, as shown below in equations (1) and (2). The phase shift is related to the air gap length in the sensor (12 in FIG. 1) and the wavelength of the light source as shown in the equation (3). By comparing using the interferometric spectral fringe from the sensor (12 in FIG. 1) with test fringes that are generated by computer for a predetermined range of the air gap length, and finding the best match (finding the peak of the correlation function), it is possible to evaluate the air gap length very accurately.

The ratio of reflected optical power $P_r$ with respect to optical input power $P_i$ for a low reflectivity (R<<1) lossless Fabry-Perot interferometer is described as follows:

$$\frac{P_r}{P_i} = R_1 + R_2 - 2\sqrt{R_1 \cdot R_2}\, \cos\phi \tag{1}$$

where $R_1$, $R_2$ represent reflectivities of two reflective surfaces in the sensor, $\phi$ is the round trip (two way) optical phase shift within the air gap.

For the case of $R_1=R_2=R$:

$$\frac{P_r}{P_{in}} = 2R(1 - \cos\phi) \tag{2}$$

The optical phase shift, $\phi$, in a Fabry-Perot interferometer is as follows:

$$\phi = \frac{4\pi n d}{\lambda}\left(= \frac{4\pi v n d}{C}\right) \tag{3}$$

where n is the refractive index of the cavity material, d the distance between the two reflective surfaces, $\lambda$ represents the wavelength of light source used, v represents the optical frequency of the source, and C represents the speed of light.

When the reflection spectrum is evaluated with respect to wavelength it is not a true raised cosine function because the optical phase change with respect to wavelength change is not a linear function, as shown below in equation (4). Each interference spectrum is slightly asymmetric. If the spectrum is evaluated with respect to optical phase or optical frequency, however, the spectrum would be represented by a true raised cosine function.

$$\frac{d\phi}{d\lambda} = -\frac{4\pi n d}{\lambda^2} \tag{4}$$

$$\frac{d\phi}{dv} = \frac{4\pi n d}{C} \tag{5}$$

The visibility of the interference spectrum for an ideal sensor system is 100%. In practical implementations, due to various reasons such as reflectivity imbalance between the two reflective surfaces in the sensor, losses in the interferometer, parasite reflections and Rayleigh scattering within optical fibers, and coherence length limitation, among others, visibilities are typically less than 100%. The visibility of an interference spectrum is defined as:

$$V = \frac{I_{max} - I_{min}}{I_{max} + I_{min}} \tag{6}$$

Where $I_{max}$ and $I_{min}$ are maximum and minimum intensities in the spectrum.

The light source (18 in FIG. 1) used in the example system can be a light emitting diode ("LED"). The example LED has about 50 nm FWHM bandwidth and about 850 nm center wavelength, as explained above. For the source profile approximation, the following Gaussian distribution function can be used:

$$p(x) = \frac{1}{\sigma \cdot \sqrt{2\pi}} \cdot e^{-\frac{(x-\mu)^2}{2\sigma^2}} \tag{7}$$

where $\sigma$ is the standard deviation and $\mu$ is the mean of the distribution. The relation between the FWHM and $\sigma$ is as follows:

$$FWHM = 2\sigma\sqrt{2 \cdot \ln 2} \approx 2.355\sigma \tag{8}$$

Fourier Transform

Fourier transform is very useful and widely used in optical science.

$$F(v) = \int_{-\infty}^{+\infty} f(t)\exp(-j2\pi vt)dt \quad (9)$$

Inverse Fourier Transform:

$$f(t) = \int_{-\infty}^{+\infty} F(v)\exp(j2\pi vt)dv \quad (10)$$

Correlation Theorem:
The correlation between two complex functions is defined as:

$$f(t) = \int_{-\infty}^{+\infty} f_1^*(\tau) \cdot f_2(t+\tau)d\tau \quad (11)$$

and the Fourier transforms of $f_1(t)$, $f_2(t)$, and $f(t)$ are related by:

$$F(v) = F^*_1(v) \cdot F_2(v) \quad (12)$$

Conceptually, the correlation theorem above and the inverse Fourier transform can be used to obtain the correlation function. In practice, the calculations in the processor (22 in FIG. 1) are performed by following equation:

$$sum(k) = \sum_{m=1}^{samplesize} env_m \cdot specdata_m \cdot \left\{-\cos\left(\frac{4\pi \cdot agtest(k)}{x_m}\right)\right\}$$

Where, k is the index for air gap scanning range, m is the index for wavelength range used, env is the envelope function used, such as a Gaussian function, specdata is normalized and zero-centered interference spectra from the sensor, and the agtest is the air gap values for the correlation function.

Methods according to the invention may provide more robust, reliable and accurate determination of optical path length in dispersive, white light interferometric sensors and sensor systems than previously known methods.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for demodulating signals from an optical interferometer, comprising:
   generating test interferometry spectra for an interferometer coupled to an optical sensor for various values of optical path length through the optical sensor;
   correlating the test spectra to a measured spectrum from the sensor to generate a correlation function; and
   finding the optical path length of the optical sensor corresponding to the test spectrum that generates the highest value of the correlation function.

2. The method of claim 1 further comprising determining a value of a measured parameter from the determined optical path length.

3. The method of claim 1 further comprising resolution enhancement of measurement by repeating the correlation using a smaller optical path length increment.

4. The method of claim 1 further comprising moving averaging the measured spectrum.

5. The method of claim 4 further comprising normalizing the averaged spectrum with respect to a spectrum of a light source used to generate the measured spectrum.

6. The method of claim 5 further comprising centering the normalized spectrum with respect to zero amplitude.

7. The method of claim 6 further comprising applying a Gaussian envelope function to the zero centered spectrum.

8. The method of claim 1 wherein the optical sensor comprises an extrinsic fiber Fabry-Perot interferometer.

9. A method for measuring a parameter in a wellbore, comprising:
   applying a light source to an optical sensor disposed in the wellbore, the optical sensor arranged to change an optical path length therein in response to changes in the parameter;
   coupling an output of the sensor to an optical interferometer;
   generating test interferometry spectra for various values of optical path length of the sensor;
   correlating the test spectra to a measured spectrum from the interferometer to generate a correlation function;
   determining an optical path length of the sensor by finding the maximum value of the correlation function; and
   determining a value of the parameter from the determined optical path length.

10. The method of claim 9 further comprising resolution enhancement by repeating the correlation using a smaller optical path length increment.

11. The method of claim 9 further comprising moving averaging the measured spectrum.

12. The method of claim 11 further comprising normalizing the averaged spectrum with respect to a spectrum of a light source used to generate the measured spectrum.

13. The method of claim 12 further comprising centering the normalized spectrum with respect to zero amplitude.

14. The method of claim 13 further comprising applying a Gaussian envelope function to the zero centered spectrum.

15. The method of claim 9 wherein the parameter comprises pressure.

16. The method of claim 9 wherein the optical sensor comprises an extrinsic fiber Fabry-Perot interferometer.

* * * * *